Figure 1:
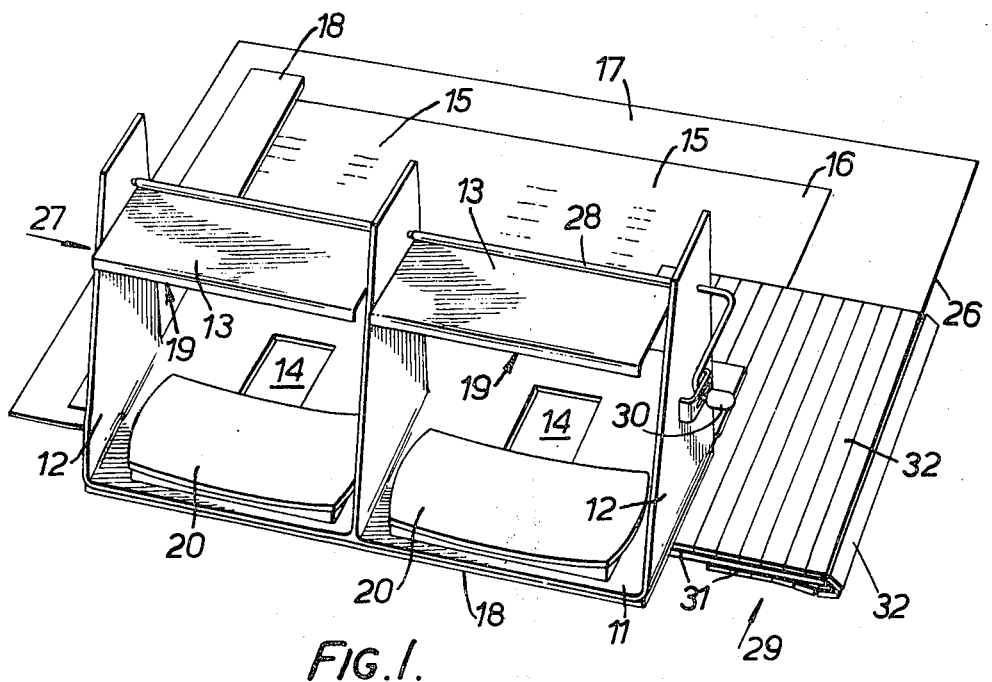

United States Patent [19]

Davies et al.

[11] 3,926,509

[45] Dec. 16, 1975

[54] DOUBLE REFLECTION VIEWING INSTRUMENT

[76] Inventors: George Davies; Hedda Wertheimer, both of 36½ David Place, St. Helier, Jersey, Guernsey (Channel Is.)

[22] Filed: Feb. 5, 1974

[21] Appl. No.: 439,728

[30] Foreign Application Priority Data
Feb. 9, 1973 United Kingdom............... 6450/73
May 21, 1973 United Kingdom............. 24135/73

[52] U.S. Cl. ............... 350/301; 350/294; 350/138; 350/143; 40/352
[51] Int. Cl.² .................. G02B 5/08; G02B 27/24
[58] Field of Search .......... 350/293, 294, 295, 296, 350/299, 301, 303, 304, 55, 137, 138, 143; 353/27; 35/37, 9 H; 40/352; 248/476, 480

[56] References Cited
UNITED STATES PATENTS

| 489,953 | 1/1893 | Hill ..................................... 350/301 |
| 871,974 | 11/1907 | Verbeck ............................. 350/138 |
| 1,269,663 | 6/1918 | Wappler ............................ 350/137 |
| 2,283,114 | 5/1942 | Wesley ............................... 350/301 |
| 2,588,416 | 3/1952 | Sawyer .............................. 350/143 |
| 2,834,270 | 5/1958 | Williams ............................ 350/138 |
| 2,889,743 | 6/1959 | Rabben .............................. 350/137 |
| 3,180,207 | 4/1965 | Herrmann .......................... 350/301 |

FOREIGN PATENTS OR APPLICATIONS
720,633  11/1965  Canada ............................. 350/294

Primary Examiner—Ronald J. Stern
Assistant Examiner—Jon W. Henry
Attorney, Agent, or Firm—Oblon, Fisher, Spivak, McClelland & Maier

[57] ABSTRACT

This invention is an optical viewing instrument having a concave mirror for magnifying material to be viewed; there are two mirrors, one of which reflects light from an area beside the other mirror onto the other mirror for easy viewing. The instrument can be located in relation to a sheet carrying the material by a sideways extending mounting strip consisting of rigid fingers on a flexible backing for keeping the instrument aligned with the edge of the strip.

13 Claims, 2 Drawing Figures

DOUBLE REFLECTION VIEWING INSTRUMENT

This invention relates to viewing instruments which have a magnifying capability so as to be suitable for reading printing or other matter which is too small to be interpreted by the unaided eyes.

According to the invention a viewing instrument is arranged to be mounted on a sheet of material to be studied and incorporates at least one concave or otherwise—curved mirror disposed to present to the eye of the reader a magnified image of material on the sheet.

There are preferably two mirrors, both of which or only one of which, may be concave, and one of them — which is disposed to be viewed — can be positioned a little displaced from the material forming the image to be studied. A convenient construction has a leg or legs and a bridge piece arranged to straddle the material on the sheet, and there may be a base plate carrying the legs and having an aperture for the material to be studied. All the inner surfaces are preferably non-reflecting.

Preferably a second mirror is on a mounting which is pivotable about an axis through the centre of curvature of the curved mirror. The second mirror may be a flat mirror or may itself be a curved mirror, in which case the pivot axis will also pass through the centre of curvature of the second mirror.

The pivot arrangement enables the field of view to be scanned merely by the pivoting action and in that way the user can read a wider field without moving the instrument bodily or can readily find which way to move the instrument bodily to bring the part he wants to read into the centre of the field of view.

The base plate conveniently incorporates ferrous or magnetic means enabling it to be mounted on a ferrous or magnetic support for the sheet and possibly also to hold the sheet in position on the support. Alternatively or in addition, the sheet could be held in position on the support by a magnetic or ferrous clamp plate which also defines a guiding edge along which the base plate can be slid as the matter is read and more matter is to be presented.

According to a second aspect of the present invention the viewer has a mounting sheet which is flexible about axes parallel with the up and down direction of a sheet of material to be read, but is substantially inflexible about axes perpendicular to those axes in the plane of the sheet.

The arrangement enables the viewer to be easily moved horizontally to find a desired part of the sheet, and then to be located in a selected position by folding the sheet around the edge of the material. Without changing the location the viewer can be moved down the sheet keeping in registry with the selected material by keeping the inflexible lines in the sheet against the page edge.

Preferably the sheet consists of a number of rigid strips side by side on a flexible backing and extending parallel with the direction of the edge of the sheet of material.

The holding means can have bearings for spools or the like enabling a continuous roll of matter to be moved past the instrument.

The instrument may be of single form for monocular or binocular viewing, or may be of double form for binocular viewing.

The invention may be carried into practice in various ways and two embodiments will be described by way of example with reference to the accompanying drawings, in which the two figures are perspective views of viewing instruments embodying the invention.

The instrument of FIG. 1 consists of a base plate 11, a pair of legs 12, and a bridge piece 13. The base plate has slots 14 through which is exposed matter to be read and which, in the example being described, consists of parts of columns of similar reading matter 15 printed on a sheet 16 of a size too small to be read without some optical aid. Each column is for one eye of the reader, so that the advantage of binocular vision can be obtained.

The sheet 16 is located in position on a support 17 by means of a magnetized under surface 18 of the base plate 11 enabling it to be held firmly in relation to the steel plate constituting the support 17 and to clamp the sheet between the two.

The instrument embodies for each eye two mirrors 19 and 20 of which the mirrors 20 are concave so as to have a magnifying effect. The matter appearing in each slot 14 can be viewed in one of the mirrors 20 after light has been reflected from the surfaces of both mirrors; the mirror is displaced a little from the slot so that the magnified image is conveniently positioned.

The viewer can be moved bodily over a surface carrying material to be magnified and read, whether it is the page of a book, a separate sheet mounted on the support 17 or a card. In general the surface to be read will have an edge 26 perpendicular to the horizontal lines along which printing will be carried on the surface 16.

The user looks into the mirrors 20 generally in the direction indicated at 27 and in order to enable him to see a wide field of vision vertically, the bridge 13 carrying the mirrors 19 is arranged to be pivotable about an axis 28 perpendicular to the edge 26 and passing through the centres of curvature of the mirrors 20. Thus without moving the instrument but merely by rocking the bridge 13 by use of a handle 30 the user can examine material above and below the material appearing in the field of vision before such pivoting movement.

The mirrors 19 could be flat mirrors, but could also be curved mirrors to get increased magnification and in that case the centres of curvature of the mirrors 19 would also lie on the pivot axis 28.

The base plate 11 is carried on a flexible support sheet generally indicated at 29 which consists of a flexible backing 31 carrying on its upper surface a number of relatively narrow parallel sided rigid plastic strips or slats 32. It will be appreciated that the sheet 29 is very flexible about the axis parallel with the edge 26 but is relatively inflexible about all other axes. Thus once the viewer has been positioned horizontally in relation to the material 15 to be read the sheet can be folded around the edge 26 and retained by the hand holding the viewer and this will serve to locate the viewer horizontally. However as reading proceeds and the user wants to read matter further down the page he can merely slide the instrument along the edge 26 keeping it in location by co-operation between the edge 26 and the slats 32.

In some applications it is advantageous to have a magnifying lens between the material being read and each mirror 19. The focus of the lens (after reflection at 19) would coincide with that of the mirror 20. The lens would be on a bar swinging as one piece with the mirror 19 about the axis 28, in the manner of a pendulum.

The mirror may be adjustable a little in height to suit different eyes, and could be surface coated to reduce color fringes.

The inside surfaces of the instrument are painted matt black to assist in preventing anything else being seen.

In practice many users will use only one eye; and a monocular instrument consisting of a half of the instrument shown in FIG. 1 can be made. The eye not in use must converge with the eye being used on the mirror 20, but must see nothing. The part of the base plate 11 surrounding the slot 14 is in effect a mask enabling this effect to be achieved.

A single sheet of material 16 to be read could be clamped to the steel plate 17 by a magnentic strip 18 and then the edge of the plate 17 can be used to guide movement of the instrument.

Figure 2:
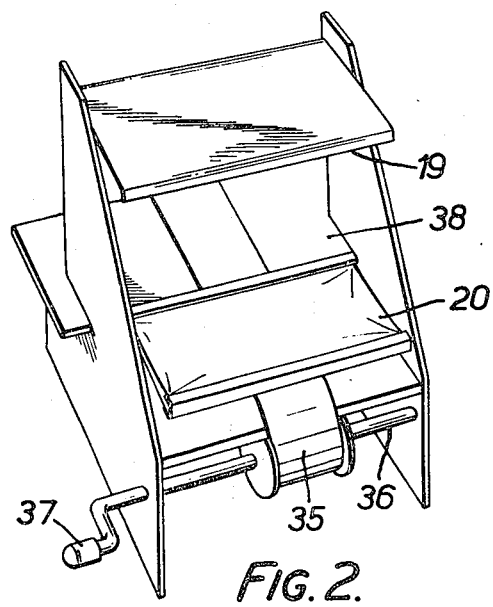

Instead of being flat as shown in FIG. 1, the material may be arranged as a roll 35 on two spools 36 as shown in FIG. 2, the roll being guided to pass over a table 38 and under the mirror 20 upon movement of a handle 37. Once again the instrument could be monocular or binocular.

What we claim as our invention and desired to secure by Letters Patent is:

1. A viewing instrument comprising:
    a base for mounting a sheet upon which material to be viewed is disposed;
    a first mirror mounted above said base to reflect light from said sheet;
    a second mirror mounted upon said base for reflecting light to the user's eye from said sheet and said first mirror, one of said mirrors being a curved magnifying mirror; and
    an adjustable mounting means for said first mirror for enabling said user to continuously manually pivot said first mirror about an axis through the center of curvature of said curved mirror so as to enable said viewing instrument and said user to continuously scan said sheet.

2. A viewing instrument as claimed in claim 1 having locating means for holding said viewing instrument in relation to said sheet containing said material to be studied.

3. An instrument as claimed in claim 1 in which said first mirror is arranged to direct light from a part of the sheet displaced to one side of said second mirror onto said second mirror.

4. An instrument as claimed in claim 1 in which both of said mirrors are curved mirrors.

5. An instrument as claimed in claim 1 comprising: a bridge over said second mirror which bridge carries said first mirror such that its reflective side faces said base.

6. An instrument as claimed in claim 3 in which said base has an aperture through which said material to be studied may be viewed.

7. An instrument as claimed in claim 2 in which said locating means comprises ferrous material within said base of said instrument.

8. An instrument as claimed in claim 2 including bearings for spools arranged to carry said sheet material to be studied which is in the form of a roll, and in which said locating means comprises a guide for guiding the material from one spool to another along a path in which it can be seen in said first mirror.

9. An instrument as claimed in claim 1 in which the optical components are duplicated for binocular viewing.

10. An instrument as claimed in claim 2 in which said locating means comprises a mounting sheet which is flexible about a plurality of axes parallel with the edge of said sheet being studied which extends from the top to the bottom of said sheet to be studied, but is substantially inflexible about axes perpendicular to said plurality of axes, said mounting sheet being wrapped about one edge of said base disposed parallel to said edge of said sheet so as to maintain the alignment of said instrument with said base and said sheet being studied.

11. An instrument as claimed in claim 10 in which the mounting sheet comprises a number of rigid parallel strips disposed side by side on a flexible backing and extending parallel with the direction of said edge of said sheet of material to be studied.

12. An optical viewing instrument including means for magnifying an image of material on a sheet to be studied, and on which the instrument is placed, and having a mounting sheet which is flexible about a plurality of axes parallel with the edge of said sheet being studied which extends from the top to the bottom of said sheet but is substantially inflexible about axes perpendicular to said pluurality of axes, said mounting sheet being wrapped about an edge of a base, supporting said instrument, which is disposed parallel to said edge of said sheet so as to maintain the alignment of said instrument with said base and said sheet.

13. An instrument as claimed in claim 12, said mounting sheet comprising a number of rigid strips disposed side by side on a flexible backing and extending parallel with the direction of said edge of said sheet of material to be studied.

* * * * *